United States Patent [19]

Van Ostrand et al.

[11] Patent Number: 5,454,511

[45] Date of Patent: Oct. 3, 1995

[54] CONTROLLED SETPOINT RECOVERY

[75] Inventors: William F. Van Ostrand; Rajendra K. Shah, both of Indianapolis, Ind.; Laurie L. Werbowsky, Jamesville; Peter G. Pierret, Fayetteville, both of N.Y.

[73] Assignee: Carrier Corporation, Syracuse, N.Y.

[21] Appl. No.: 310,525

[22] Filed: Sep. 22, 1994

[51] Int. Cl.[6] .................................................... F23N 5/20
[52] U.S. Cl. ............................ 236/46 R; 165/12; 165/29
[58] Field of Search ...................... 236/46 R;47; 165/12, 165/29; 364/505, 557

[56] References Cited

U.S. PATENT DOCUMENTS

| | | | |
|---|---|---|---|
| 4,522,336 | 6/1985 | Culp | 236/46 R |
| 4,632,177 | 12/1986 | Beckey | 165/12 |
| 4,674,027 | 6/1987 | Beckey | 364/143 |
| 4,706,882 | 11/1987 | Barnard | 165/12 X |
| 5,192,020 | 3/1993 | Shah | 165/12 X |
| 5,211,332 | 5/1993 | Adams | 236/78 D |
| 5,270,952 | 12/1993 | Adams et al. | 364/505 |
| 5,314,004 | 5/1994 | Strand et al. | 165/2 |

*Primary Examiner*—William E. Wayner

[57] ABSTRACT

A process is disclosed for controlling the operative setpoint of a thermostat during transition from a currently scheduled setpoint temperature to the next scheduled setpoint temperature. The operative setpoint is changed by small amounts at calculated time intervals. The time intervals are a function of the transition periods allocated for different types of systems for air conditioning air that may be operatively connected to the thermostat as well as the difference between the currently scheduled setpoint temperature and the next scheduled setpoint temperature.

19 Claims, 4 Drawing Sheets

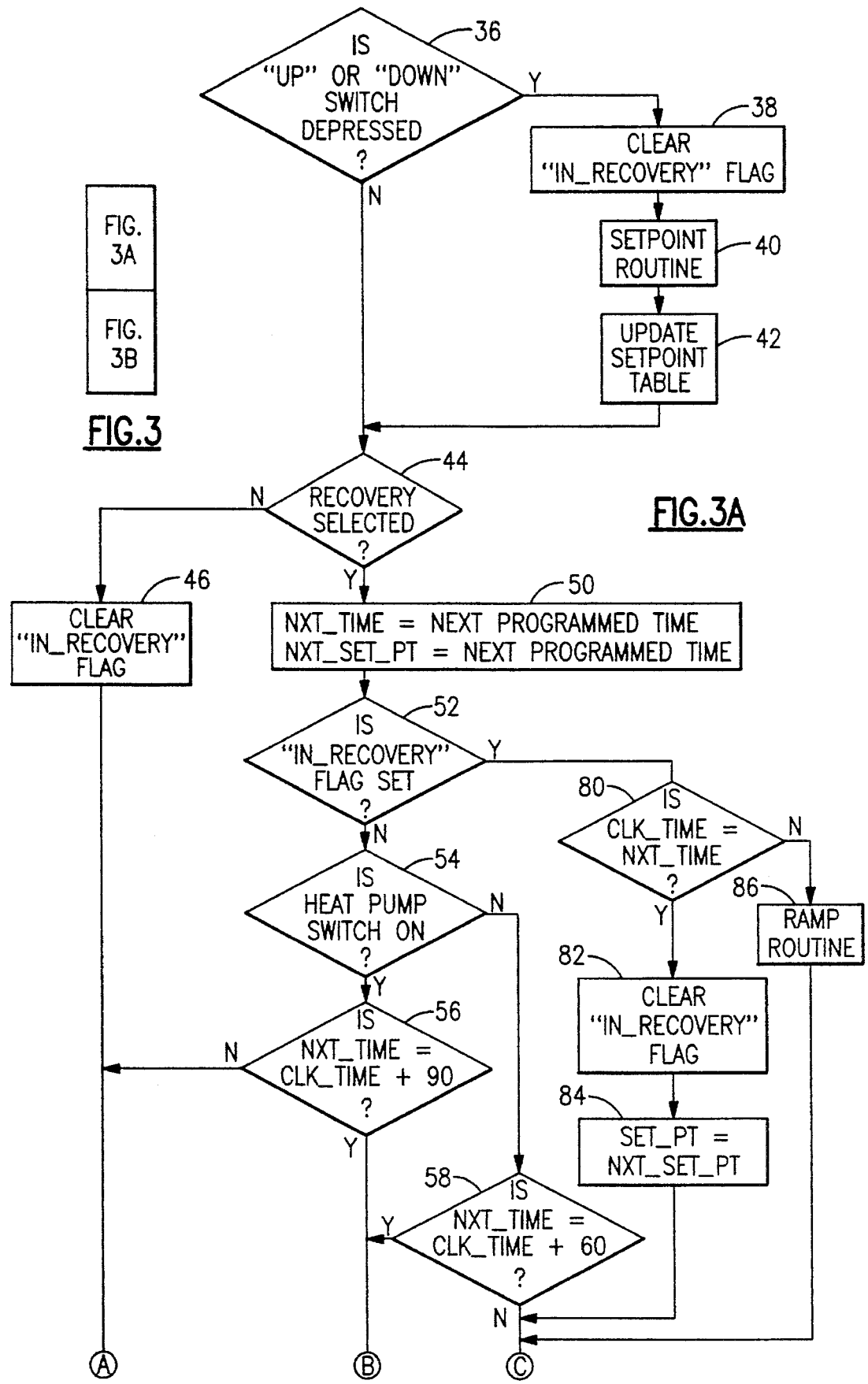

5,454,511

CONTROLLED SETPOINT RECOVERY

BACKGROUND OF THE INVENTION

This invention relates to programmable thermostats having various setpoints occurring at various programmed times. In particular, this invention relates to the recovery of the temperature in the space governed by the thermostat when a change in programmed setpoint temperature is scheduled to occur at a particular time.

Programmable thermostats having a series of user selected setpoints occurring at different times of the day or week are well known. These user selected setpoints may vary widely depending on the time of day or week. For instance, the setback temperature for an unoccupied home or office space at different times of the day or week may be quite different than the setpoint temperature for the space when it is to be occupied. This may result in a large demand being placed on a heating or cooling system associated with the thermostat when recovering from the setback temperature.

Programmable thermostats have heretofore included a recovery feature that permits the activation of a heating or cooling system prior to the scheduled change in setpoint temperature. These programmable thermostats typically authorize the setpoint to incrementally change from a starting time that is often determined by the thermostat. These thermostats have moreover attempted to define the slope by which the setpoint temperature changes so as to eliminate or lessen the overshoot of the target setpoint temperature. These starting times and slopes are derived internally by the thermostat based on recent histories of recovery from setpoint by the thermostat. These starting times and slopes of changing temperature versus time will vary from day to day depending on the most recent histories of setpoint recovery. As a result, there is no predictable time or rate of setpoint recovery.

OBJECT OF THE INVENTION

It is an object of the invention to provide a thermostat with a predictable setpoint recovery from a setback temperature.

SUMMARY OF THE INVENTION

The above and other objects are achieved by providing a programmable thermostat that initiates a controlled recovery at either of two predictable times relative to a scheduled time of setpoint transition. Recovery occurs at the longer of the two predictable times when a first type of system for conditioning air is being relied upon to bring the temperature to the next scheduled setpoint. Recovery otherwise occurs at the shorter predictable recovery time. The controlled recovery includes a process for frequently changing the operative setpoint of the thermostat. Each change in the operative setpoint is relatively small when compared to the total change in setpoint temperature scheduled to occur. In the preferred embodiment, the small changes are only one-tenth of a degree change in temperature. Each small change occurs after a calculated increment of time has elapsed. The calculated increment of time is a function of either of the two possible recovery periods that may be selected according to which system for conditioning air is to be relied upon to bring the temperature to the next scheduled setpoint. The selected recovery period is preferably divided by the difference between the current user selected setpoint and the next setpoint scheduled to occur.

BRIEF DESCRIPTION OF THE DRAWINGS

Other objects and advantages of the present invention will be apparent from the following description in conjunction with the accompanying drawings in which:

FIG. 3 shows the relationship between FIGS. 3A and 3B;

FIGS. 3A and 3B illustrate a control process executable by the microprocessor of FIG. 2 during an automatic recovery mode of operation.

DESCRIPTION OF THE PREFERRED EMBODIMENT

Figure 1:
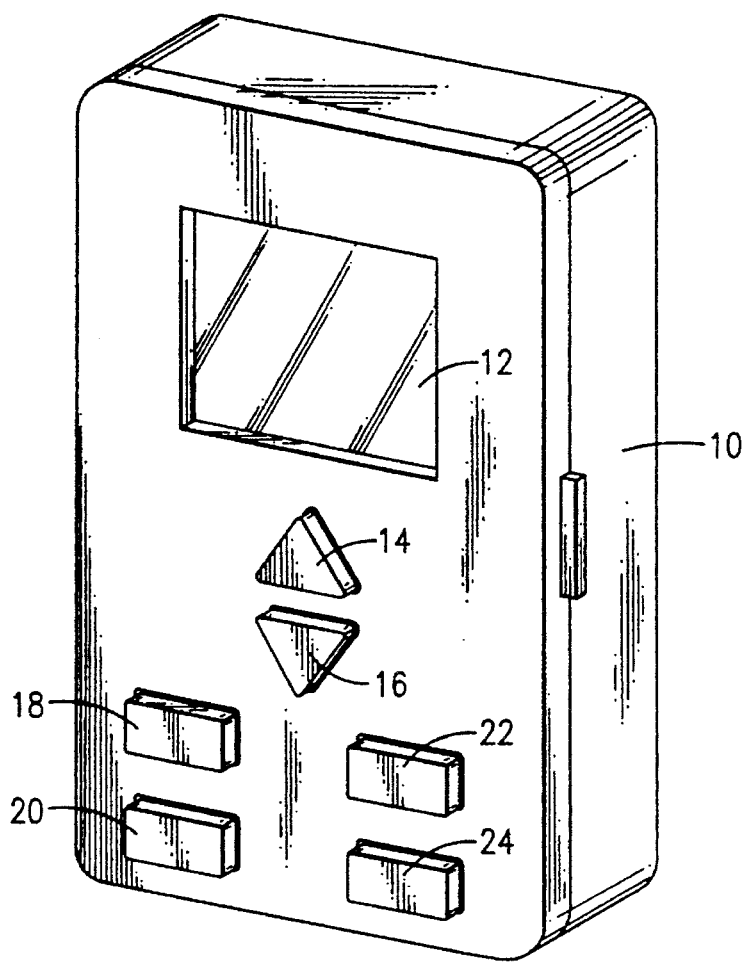
FIG. 1 illustrates a programmable thermostat having appropriate switch selections for a recovery mode of operation.

Referring to FIG. 1, a thermostat 10 is seen to include a liquid crystal display 12 as well as an up-pressure sensitive switch 14 and a down-pressure sensitive switch 16. The thermostat also includes a mode selection switch 18, a recovery selection switch 20, a heat pump indication switch 22, and a programming switch 24.

The thermostat is operative to normally display the currently sensed temperature. The thermostat is furthermore operative to display setpoint temperatures and their programmed times by depression of the programming switch 24. The programmable thermostat is furthermore operative to change or add setpoint temperatures and associated times in which the setpoint temperatures are to be in effect. This is accomplished by a setpoint routine within the thermostat responsive to depression of either the up-switch 14 or the down-pressure sensitive 16 in combination with the programming switch 24. It is also to be understood that the thermostat 10 will normally display the present mode of operation. The thermostat will moreover display alterative modes of operation when the mode switch 18 is depressed. The release of the mode switch upon the display of any particular mode of operation will result in that particular mode of operation being selected. It is finally to be appreciated that the thermostat 10 is operative to initiate appropriate recoveries from current setpoint temperatures to scheduled setpoint temperatures when the recovery selection switch 20 is in an "on" state.

Figure 2:
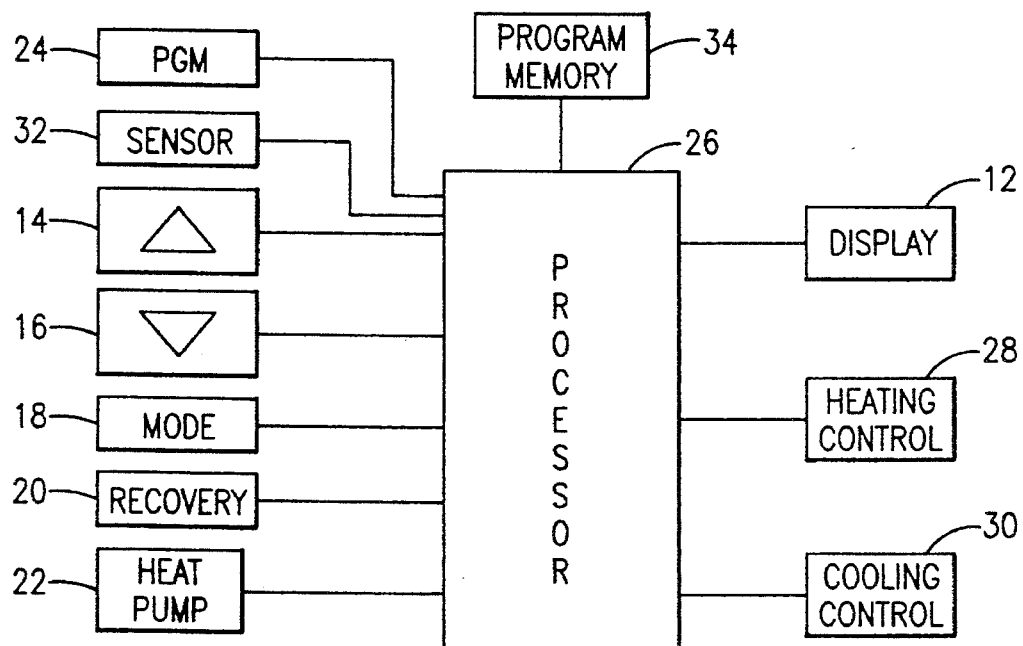
FIG. 2 illustrates a microprocessor control residing within the thermostat of FIG. 1 and interfacing with a heating control and a cooling control.

Referring to FIG. 2, the display 12, up-switch 14, down-switch 16, mode switch 18, recovery switch 20, heat pump switch 22 and programming switch 24 are seen to be operatively connected to a microprocessor 26. The microprocessor 26 is also operatively connected to a heating control 28 and a cooling control 30. The microprocessor 26 is furthermore connected to a sensor 32 which senses the temperature of a space in which the thermostat resides.

The microprocessor will initially respond to any variation between the sensed temperature from the sensor 32 and a particular setpoint temperature so as to activate the heating control 28 when the sensed temperature is less than the setpoint temperature and activate the cooling control 30 when the sensed temperature is above the setpoint temperature. The microprocessor performs these tasks as well as others by executing instructions stored in a program memory 34. The microprocessor will also implement a recovery process which will cause the setpoint temperature to change prior to a scheduled change time in setpoint temperature. The recovery process is automatically implemented if a recovery feature has been selected by the recovery switch 20.

Figure 3B:
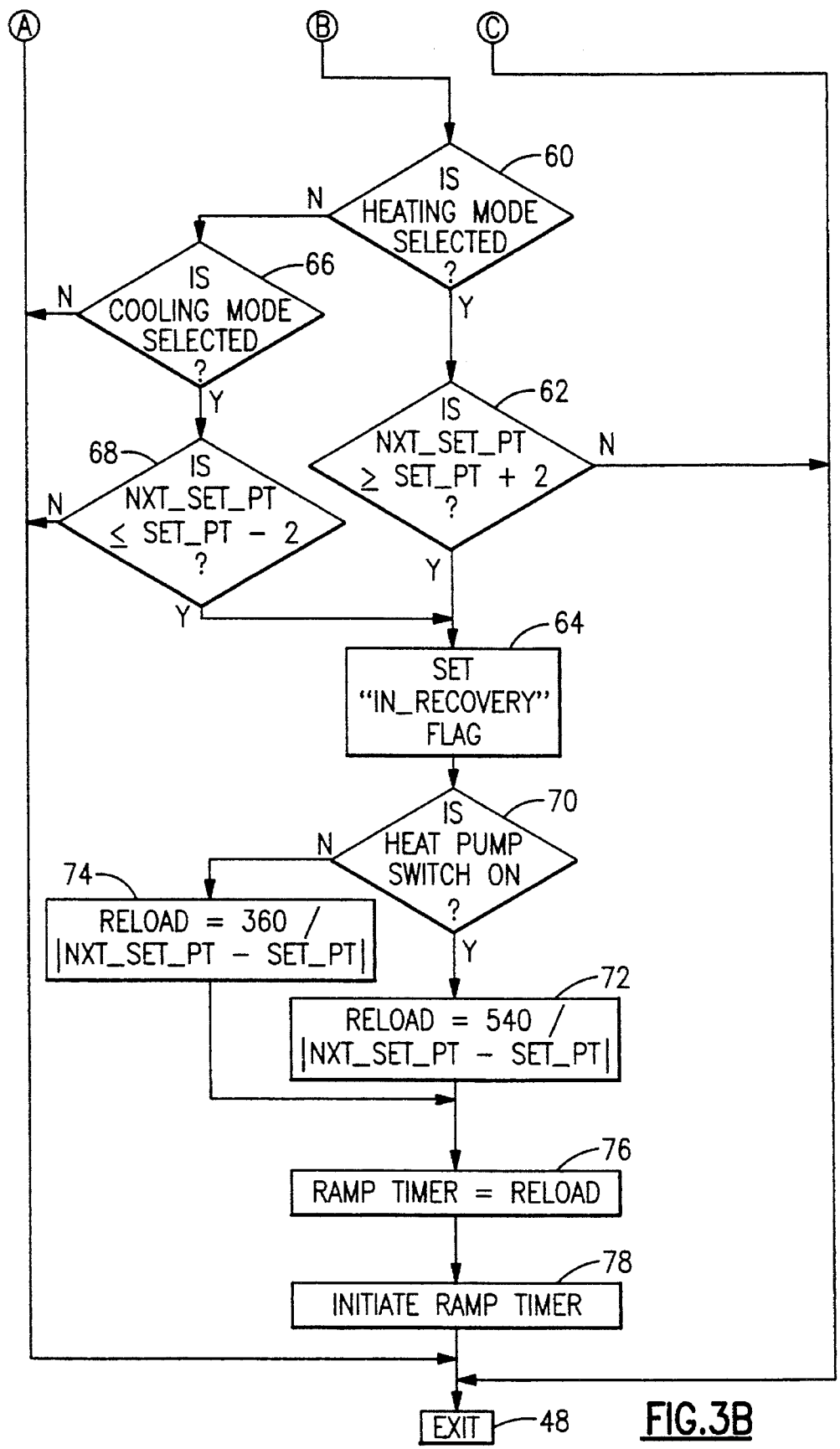

Referring to FIG. 3A, a flow chart of the recovery process stored in the program memory 34 and executed by the microprocessor 26 is illustrated. It is to be appreciated that the recovery process will potentially be preceded by a number of control processes executed by the microprocessor. At some point, the microprocessor will encounter a step 36 and inquire as to whether either the up-switch 18 or the down-switch 20 have been depressed. In the event that either switch has been depressed, the microprocessor will clear an IN_RECOVERY flag in a step 38 and thereafter proceed to a setpoint routine in a step 40. The setpoint routine displays either setpoint values or programmed change times in response to depression of the switch 24. Either a setpoint or a time is entered when either the up or the down switch is depressed. The entered information is immediately stored in an updated setpoint table in step 42. The setpoint table will reside in the program memory 34 and will include a sufficient number of storage locations to accommodate the setpoints and associated times that are entered by the user. The setpoint table will also be preferably configured so as to allow a pointer to point to the next programmed time and setpoint temperature scheduled to occur. Such a pointer might include a routine for noting the next nearest programmed time scheduled to occur relative to the present clock time.

The microprocessor will proceed either directly from step 36 or from step 42 to a step 44 and inquire as to whether a recovery capability has been selected. It will be remembered that the recovery capability is selected at any time by switching the recovery switch 20 on. If the recovery capability has not been selected, then the microprocessor will clear the "IN_RECOVERY flag in step 46 and thereafter proceed to an exit step 48 in FIG. 3B.

Assuming that recovery has been selected, the microprocessor will proceed to a step 50 and set certain variables equal to values in the current setpoint table. In this regard, NXT_TIME is set equal to the next programmed time indicated by the pointer within the setpoint table. In a similar manner, NXT_SET_PT is set equal to the next programmed setpoint pointed to in the setpoint table. The microprocessor will proceed from step 50 to inquire in a step 52 as to whether the IN_RECOVERY flag has been set. This flag will initially be clear until set in a manner which will be hereinafter described. The microprocessor will therefore proceed to a step 54 and inquire as to whether the heat pump switch 22 is on. The heat pump switch 22 will have been activated in the event that the thermostat is connected to a heat pump system. Such a system will normally condition air in a space at a preferred savings in cost when compared to traditional systems for conditioning air. Such heat pump systems however normally require longer to change the temperature of the air being conditioned. Accordingly, if the heat pump switch is on, the microprocessor proceeds to a step 56 and inquires as to whether NXT_TIME is equal to the present clock time, CLK_TIME, plus ninety minutes. These times will preferably be expressed in time increments no smaller than minutes. It is to be appreciated that the process of FIGS. 3A and 3B will execute several times each minute so that a programmed time expressed in hours and minutes will be compared several times a minute to the present clock time plus the added ninety minutes in step 56. This will assure that step 46 will be encountered at some point in time when CLK_TIME plus ninety minutes equals NXT_TIME. Referring again to step 54, in the event that the heat pump switch 22 is not on, the microprocessor will proceed to a step 58 and inquire as to whether NXT_TIME is equal to the CLK_TIME plus sixty minutes. The sixty minute time interval is used in step 58 since the heating or cooling system associated with the thermostat will have a faster response time than a heat pump.

Assuming that the CLK_TIME is either ninety or sixty minutes from the next programmed time as required by steps 56 or 58, the microprocessor will proceed along an appropriate yes path from either step to a step 60. Referring to step 60, the microprocessor inquires whether the heating mode has been previously selected. It will be remembered that this mode of operation of the thermostat may be selected by appropriately depressing the mode switch 18 until the heat mode of operation is displayed. If the heating mode of operation has been previously selected, the microprocessor will proceed to a step 62 and inquire as to whether the next programmed setpoint, NXT_SET_PT, is greater than or equal to the current setpoint, SET_PT, plus a numerical constant which is preferably two. It is to be noted that the numerical constant of two will represent two degrees Fahrenheit if the programmed setpoints are expressed in degrees Fahrenheit. The numerical constant of two will otherwise represent two degrees Celsius if the programmed setpoints are expressed in degrees Celsius. If the answer is yes, the microprocessor will proceed to a step 64 and set the IN_RECOVERY flag. Referring again to step 60, in the event that the heating mode has not been previously selected, the microprocessor will proceed to a step 66 and inquires as to whether a cooling mode has been selected. If a cooling mode has been selected the microprocessor proceeds to a step 66 and inquires as to whether the next programmed setpoint, NXT_SET_PT, is less than or equal to the current setpoint, SET_PT, minus the numerical constant of two. If the next set point is two degrees or more below the current setpoint, the microprocessor will proceed from step 68 to step 64 and set the IN_RECOVERY flag. If the IN_RECOVERY flag is set in step 64, the microprocessor proceeds to a step 70 and inquires as to whether the heat pump switch is on. In the event that the heat pump switch is on indicating that a heat pump system is to be relied upon, then the microprocessor proceeds to a step 72 and calculates a RELOAD value. This value is obtained by first calculating the absolute value of the difference between the next programmed setpoint and the current setpoint. This calculated difference is divided into a fractional amount of the total recovery time that has been allocated for recovery using a heat pump system. The fractional amount is preferably one-tenth of the total recovery time which translates to five hundred forty seconds for a total allocated recovery time of ninety minutes. It will be remembered that there must be at least a two degree temperature difference between NXT_SET_PT and SET_PT in order to reach step 72. It is hence to be appreciated that the maximum RELOAD value that may be calculated will be five hundred forty seconds divided by two degrees of temperature change or two hundred seventy seconds. RELOAD value will usually be considerably less than two hundred seventy seconds since the temperature difference between NXT_SET_PT and SET_PT will usually be greater than two degrees.

Referring again to step 70, in the event that a heat pump system is not associated with the thermostat, the microprocessor will proceed to a step 74 and calculate a RELOAD value based on a total recovery time of sixty minutes. In this regard, the absolute value of the calculated temperature difference between next programmed setpoint and current setpoint will be divided into one-tenth of sixty minutes. This will result in a maximum possible RELOAD value of one hundred eighty seconds.

Regardless of which RELOAD value is calculated in steps 72 or 74, the microprocessor will proceed in a step 76 and set a ramp timer equal to the calculated RELOAD value. The ramp timer will be explained in detail hereinafter. The ramp timer immediately begins decrementing from the RELOAD value in a step 78 which initiates the ramp timer decrementing process. The microprocessor proceeds to exit step 48 following step 78. Referring to steps 56, 58, 62, 66 and 68, it is to be noted that a no decision in any of these steps will result in the microprocessor also proceeding to the exit step 48. The microprocessor will exit from the process of FIGS. 3A through 3B in step 48 and execute various other processes stored within the program memory 34. The microprocessor will eventually return to step 36 and again initiate the process of FIGS. 3A and 3B.

Referring to step 36, if neither the up or down switch have been depressed, the microprocessor will proceed to step 44 and inquire as to whether the recovery capability continues to be selected. If so, the microprocessor proceeds to step 50 and updates the noted variables. Assuming that the IN_RECOVERY flag has been previously set in step 64, the microprocessor will proceed along the yes path from step 52 to a step 80.

Referring to step 80, an inquiry is made as to whether the present clock time, CLK_TIME, is equal to the next programmed time, NXT_TIME. It is to be noted that step 80 will be encountered several times each minute so as to thereby guarantee that the present clock time will at some point equal the next programmed time. When this occurs, the microprocessor proceeds to a step 82 and clears the IN_RECOVERY flag in a step 82. The microprocessor thereafter proceeds to a step 84 and sets the setpoint, SET_PT, equal to the value of NXT_SET_PT. It is to be appreciated that SET_PT will be set in step 84 each time a scheduled transition occurs in setpoint temperature during a recovery process. It is also to be appreciated that SET_PT will have been set by other processes executable by the microprocessor in the event that the recovery capability has not been selected. It is hence to be appreciated that SET_PT will be the currently scheduled setpoint temperature unless it is being incremented by the ramp routine of FIG. 4. It is to be noted that the pointer in the setpoint table will be changed to point to the next programmed setpoint scheduled to occur before proceeding from step 84 to step 48.

Referring again to step 80, in the event that present clock time does not equal the next programmed time, the microprocessor will proceed to a step 86 and implement a ramp setpoint routine. It is to be noted that the ramp setpoint routine will normally be executed a considerable number of times following the setting of the IN_RECOVERY flag in either step 56 or step 58 so as to require the present clock time to add either sixty or ninety minutes of time before encountering the next programmed time. The only exceptions to the above will be a cancellation of the recovery by either the user pressing the up or down switch so as to enter the setpoint routine of step 46 or if the user chooses to exit the recovery by turning the recovery switch 20 off.

Figure 4:
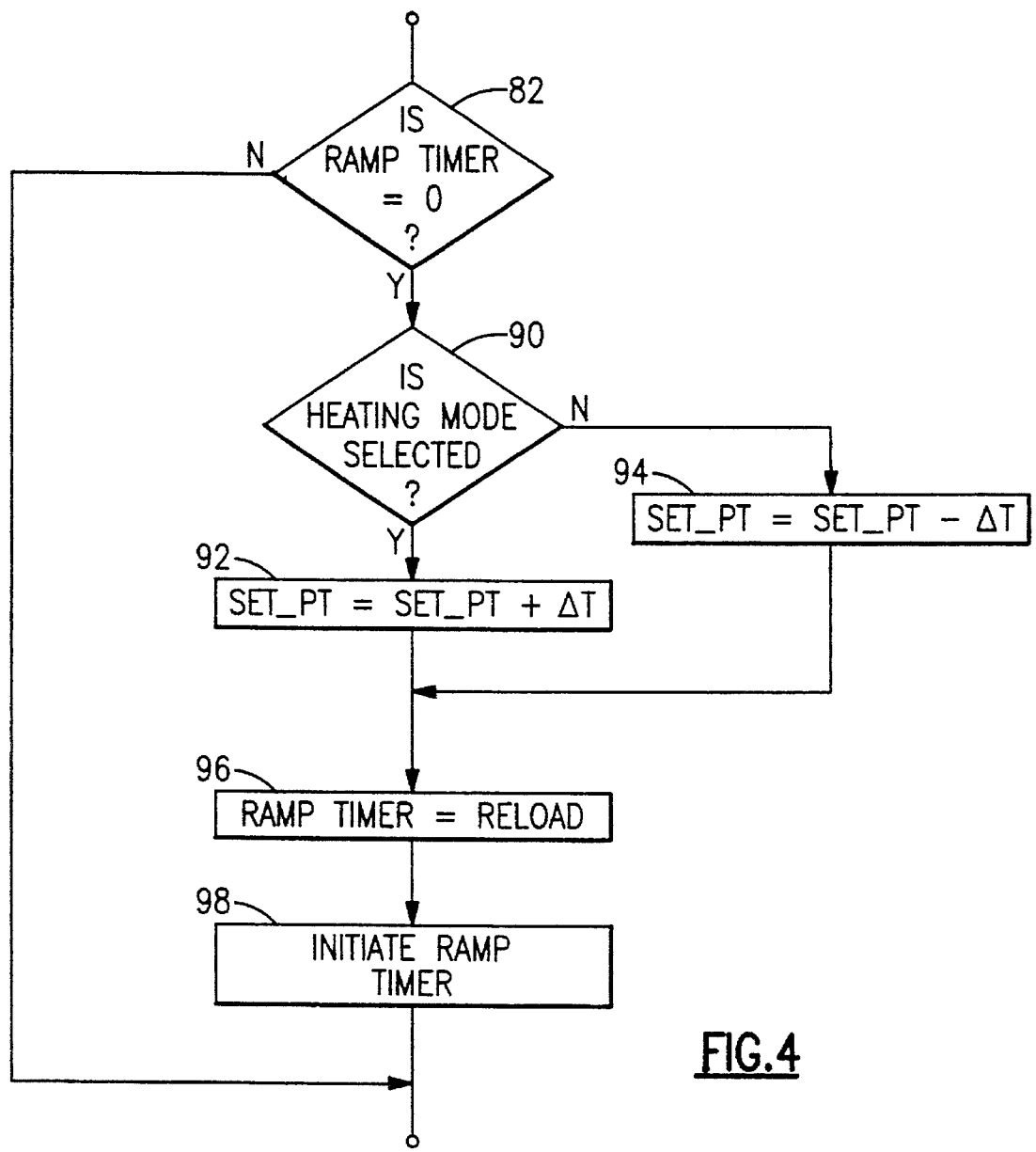
FIG. 4 illustrates an executable routine within the control process of FIGS. 3A and 3B.

Assuming that recovery is not cancelled, the microprocessor will normally implement the ramp setpoint routine as set forth in FIG. 4. Referring to FIG. 4, the first step 88 in the ramp setpoint routine is an inquiry as to whether the ramp timer is equal to zero. It will be remembered that the ramp timer immediately begins decrementing from a calculated RELOAD value in step 78 when the IN_RECOVERY flag is initially set. The microprocessor will simply exit the ramp setpoint routine of FIG. 4 until such time as the ramp timer has initially timed out.

When the ramp timer equals zero, the microprocessor will proceed to step 90 in the ramp setpoint routine. Inquiry is made in step 90 as to whether a heating mode has been selected. If the heating mode has been selected, the microprocessor proceeds in a step 92 to increment the current setpoint, SET_PT, by a predefined fractional amount of degree temperature change, $\Delta T$. The fractional amount of degree temperature change is preferably one-tenth of a degree. This will be one-tenth degree Fahrenheit if the setpoints are programmed in degrees Fahrenheit. This will assure that the operative setpoint is gradually increased in small amounts each time the ramp timer times out. The operative setpoint will increase by one-tenth degree every one hundred eighty or two hundred seventy seconds when the RELOAD value is one-tenth the preferred recovery times and recovery is two degrees of temperature change.

Referring to step 90, in the event that the heating mode has not been selected, the microprocessor will proceed in a step 94 to decrement the current setpoint preferably by the same incremental amount of one-tenth degree. Following the incrementing or decrementing of the current setpoint, the microprocessor proceeds to step 96 and sets the ramp timer equal to the calculated RELOAD value. The ramp timer will thereafter be initiated in step 98 so as to immediately begin decrementing from the RELOAD value.

It is to be appreciated that the operative setpoint of the thermostat will be successively incremented or decremented by the preferred amount each time the ramp timer equals zero. The number of such incremental rampings of the operative setpoint will be a function of the RELOAD value. As has been previously noted, the RELOAD value is a function of whether a heat pump is to be used for recovery and the particular temperature differential between the next programmed time and the current setpoint temperature at time recovery is initiated. This means the RELOAD value cannot exceed two hundred seventy seconds for a heat pump recovery or one hundred eighty seconds for a recovery without relying on a heat pump. This means that a minimum of nineteen successive increments of the setpoint will occur during the ramp setpoint routine of FIG. 4. This will be followed by a final increment of the setpoint in a step 84 when the present clock time is noted as being equal to the next programmed time.

It is to be appreciated that a process has been disclosed for gradually increasing the operative setpoint temperature of a thermostat. This gradual increase is premised on successively incrementing the setpoint a minimum of nineteen times by a ramp routine followed by a final incrementing of the setpoint at the next scheduled program time for actually changing the setpoint. The actual number of successive increments of the setpoint temperature will usually be greater since the number of degrees of change in setpoint is usually more than the minimum of two degrees. This successive incrementing or decrementing of setpoint temperature will provide a smooth gradual ramping of the setpoint temperature over the predefined periods of time allowed for recovery as a function of either utilizing or not utilizing a heat pump.

It is to be appreciated that a particular embodiment of the invention has been described. Alterations, modifications and improvements thereto will readily occur to those skilled in the art. Accordingly, the foregoing description is by way of example only and the invention is to be limited only by the following claims and equivalents thereto.

What is claimed is:

1. A process for controlling the operative setpoint temperature of a thermostat when the currently scheduled setpoint temperature is to change to the next scheduled setpoint temperature at a predetermined time in the future, said process comprising the steps of:

determining whether the thermostat is to operate on the basis of a first or a second type of system for conditioning air being operatively connected to the thermostat;

selecting a predefined period of time during which the currently scheduled setpoint temperature is to change to the next scheduled setpoint temperature depending on whether the thermostat is to operate on the basis of a first or a second type of system for conditioning air being operatively connected to the thermostat;

determining when the current time is within the selected predefined period of time of the scheduled change time to the next scheduled set point temperature; and changing the operative setpoint temperature of the thermostat by predefined amounts of temperature in calculated increments of time until the scheduled change time to the next scheduled setpoint temperature occurs whereby the operative setpoint of the thermostat gradually changes to the next scheduled setpoint during the selected predefined period of time.

2. The process of claim 1 wherein said step of changing the operative setpoint temperature by predefined amounts in calculated increments of time comprises the steps of:

calculating an increment of time that must elapse before the operative setpoint is to change; and changing the operative setpoint each time the calculated increment of time elapses.

3. The process of claim 2 wherein said step of calculating an increment of time during which the operative setpoint is to change comprises the step of:

dividing a portion of the selected predefined period of time by the difference between the next scheduled setpoint and the currently scheduled setpoint so as to produce an increment of time that must elapse before each successive change in the operative setpoint temperature.

4. The process of claim 3 wherein said step of changing the operative setpoint each time the calculated increment of time elapses comprises the step of:

changing the operative setpoint by one-tenth of a degree each time the increment of time elapses.

5. The process of claim 3 wherein the portion of the predefined period of time is equal to one-tenth of the predefined period of time.

6. The process of claim 5 wherein the difference between the next scheduled setpoint and the currently scheduled setpoint must be at least two degrees of temperature change.

7. The process of claim 3 wherein the difference between the next scheduled setpoint and the currently scheduled setpoint must be at least two degrees of temperature change.

8. The process of claim 1 wherein said step of determining when the current time is within a predefined period of time of the scheduled change time for the next scheduled setpoint temperature comprises the step of:

determining when the current time plus the selected predefined period of time is equal to the scheduled change time for the next scheduled setpoint temperature.

9. The process of claim 8 further comprising the step of:

setting a control flag when the current time plus the selected predefined period of time is equal to the scheduled change time to the next scheduled setpoint temperature so as to authorize said step of changing the operative setpoint temperature of the thermostat by predefined amounts during the time in which the control flag is set.

10. The process of claim 9 further comprising the step of:

clearing the control flag when the current time equals the scheduled change time to the next scheduled setpoint temperature thereby terminating said step of changing the operative setpoint temperature of the thermostat by predefined amounts.

11. The process of claim 8 wherein said step of selecting a predefined period of time during which the currently scheduled setpoint is to change to the next scheduled setpoint comprises the steps of:

selecting a first period of time as the predefined period of time if the thermostat is to operate on the basis of a heat pump system being connected to the thermostat; and selecting a second period of time as the predefined period of time if the thermostat is to operate on the basis that a system for conditioning air other than a heat pump is connected to the thermostat.

12. The process of claim 11 wherein said step of changing the operative setpoint of the thermostat by predefined amounts of temperature in calculated increments of time comprises:

dividing a portion of the first period of time by the difference between the next scheduled setpoint and the currently scheduled setpoint so as to define an increment of time that must elapse between successive changes in the setpoint temperature when it is determined that the thermostat is to operate on the basis of a heat pump system being connected to the thermostat; and dividing a portion of the second period of time by the difference between the next scheduled setpoint and the currently scheduled setpoint so as to define an increment of time that must elapse between successive changes in the setpoint temperature when it is determined that the thermostat is to operate on the basis that a system for conditioning air other than a heat pump system is connected to the thermostat.

13. The process of claim 1 wherein said step of determining whether the thermostat is to operate on the basis of a first or second type of system for conditioning air being operatively connected to the thermostat comprises the step of:

checking the status of a switch indicating whether the thermostat is to operate on the basis of a first or second type of system for conditioning air being operatively connected to the thermostat.

14. The process of claim 1 further comprising the step of:

checking whether a recovery authorization continues to exist before changing the operative setpoint temperature of the thermostat.

15. The process of claim 1 further comprising the steps of:

determining if the current setpoint is within a predefined temperature range of the next scheduled setpoint; and authorizing said step of changing the operative setpoint temperature of the thermostat by predefined amounts only when the current setpoint is outside the predefined temperature range.

16. A process for controlling the operative setpoint temperature of a thermostat when the currently scheduled setpoint temperature is to change to the next scheduled setpoint temperature at a predetermined time in the future said process comprising the steps of:

determining whether the thermostat is to operate on the basis of a first or second type of system for conditioning air being operatively connected to the thermostat;

determining when the current time is within a first predefined period of time of the next scheduled change time if the first type of heating or cooling system is indicated to be operatively connected to the thermostat;

determining when the current time is within a second predefined period of time of the next scheduled change time if the second type of heating or cooling system is indicated to be operatively connected to the thermostat;

changing the operative setpoint temperature of the thermostat by predefined amounts of temperature in calculated increments of time during the first predefined period of time if the first type of heating or cooling system is indicated to be operatively connected to the thermostat; and changing the operative setpoint temperature of the thermostat by predefined amounts of temperature in calculated increments of time during the second predefined period of time if the second type of heating or cooling system is indicated to be operatively connected to the thermostat.

17. The process of claim 16 wherein said step of changing the operative setpoint temperature of the thermostat by predefined amounts of time during the first predefined period of time comprises the steps of:

dividing a portion of the first predefined period of time by the difference between the next scheduled setpoint and the currently scheduled setpoint so as to produce an increment of time that must elapse before each successive change in the operative setpoint temperature; and changing the operative setpoint each time the calculated increment of time elapses.

18. The process of claim 17 wherein the portion of the first predefined period of time can be expressed as a fractional amount and wherein said step of changing the operative setpoint each time the calculated increment of time elapses comprises the step of:

changing the operative setpoint by a fraction of a temperature degree wherein the fraction of a temperature degree is equal to the fraction used in defining the fractional amount of the first period of time.

19. The process of claim 18 wherein said step of changing the operative setpoint temperature of the thermostat by predefined amounts of time during the second predefined period of time comprises the steps of:

dividing a portion of the second predefined period of time by the difference in the next scheduled setpoint and the currently scheduled setpoint so as to produce an increment of time that must elapse before each successive change in the setpoint temperature; and changing the operative setpoint each time the calculated increment of time elapses.

* * * * *